United States Patent
Voorman, Jr.

[15] 3,673,608
[45] June 27, 1972

[54] INFORMATION RECORDER
[72] Inventor: Henry Voorman, Jr., Midland Park, N.J.
[73] Assignee: Wagner Electric Corporation, Newark, N.J.
[22] Filed: Aug. 25, 1970
[21] Appl. No.: 66,808

[52] U.S. Cl. .................................. 346/18, 116/74, 340/264
[51] Int. Cl. ........................................... G01p 1/10
[58] Field of Search .......................... 346/18, 73, 123, 117 R; 116/74; 340/264; 200/80

[56] References Cited

UNITED STATES PATENTS

| | | | |
|---|---|---|---|
| 940,761 | 11/1909 | Whalen | 346/18 |
| 971,334 | 9/1910 | Whalen | 340/264 X |
| 1,267,631 | 5/1918 | Chipman | 346/73 |
| 2,178,986 | 11/1939 | Caldwell | 200/80 X |

Primary Examiner—Joseph W. Hartary
Attorney—Joseph E. Papin

[57] ABSTRACT

An information recorder is provided with a rotatable drive shaft for moving linkage means including a marking member to record the different speeds of drive shaft rotation on a movable chart in said recorder, and an adjustable member is adjustably driven by a manual adjusting member toward a preselected position to predeterminately space a contact thereon connected in an electrical warning circuit from a cooperating contact on said linkage means to thereby define the speed of drive shaft rotation at which said electrical warning circuit is energized.

This invention relates generally to information recorders and in particular to excessive speed indicating mechanisms therefor.

8 Claims, 2 Drawing Figures

PATENTED JUN 27 1972 3,673,608

INVENTOR
HENRY VOORMAN Jr.
BY Joseph E. Papin

INFORMATION RECORDER

In the past, information recorders were utilized on apparatus, such as vehicles or industrial machinery or the like, and such recorders were provided with excessive speed indicating mechanisms to warn the operator when a predetermined speed or revolutions per minute was attained. For instance, typical illustrations of such past information recorders provided with excessive speed indicating mechanisms are shown in U.S. Pat. No. 1,448,043 issued to A. E. Tillander on Mar. 13, 1923, and in U.S. Pat. No. 2,341,118 issued to C. H. H. Rodanet on Feb. 8, 1944; however, one of the disadvantageous or undesirable features of such past information recorders utilizing excessive speed indicating mechanisms was the complexity of calibrating or adjusting the instrument to define the predetermined speed at which such indicating mechanism was actuated or energized as well as the complexity of the adjusting devices themselves.

The principle object of the present invention is to provide an information recorder having an excessive speed indicating mechanism which overcomes the aforementioned disadvantageous or undesirable features, as well as others, and this and other objects and advantageous features of the present invention will become apparent hereinafter.

Briefly, the present invention comprises an information recorder having a rotatable drive mechanism, chart means movable in said casing for continuously receiving markings thereon, means driven by said drive mechanism for marking said chart means, an electrical circuit including a warning device for energization upon a predetermined speed of drive mechanism rotation, and adjustable means movable relative to said drive means including contact means connected in said electrical circuit for engagement with said driven means to predetermine the speed of drive mechanism rotation at which the warning device is energized.

DESCRIPTION OF THE DRAWINGS

In the drawings wherein like numerals refer to like parts wherever they occur.

Figure 1:
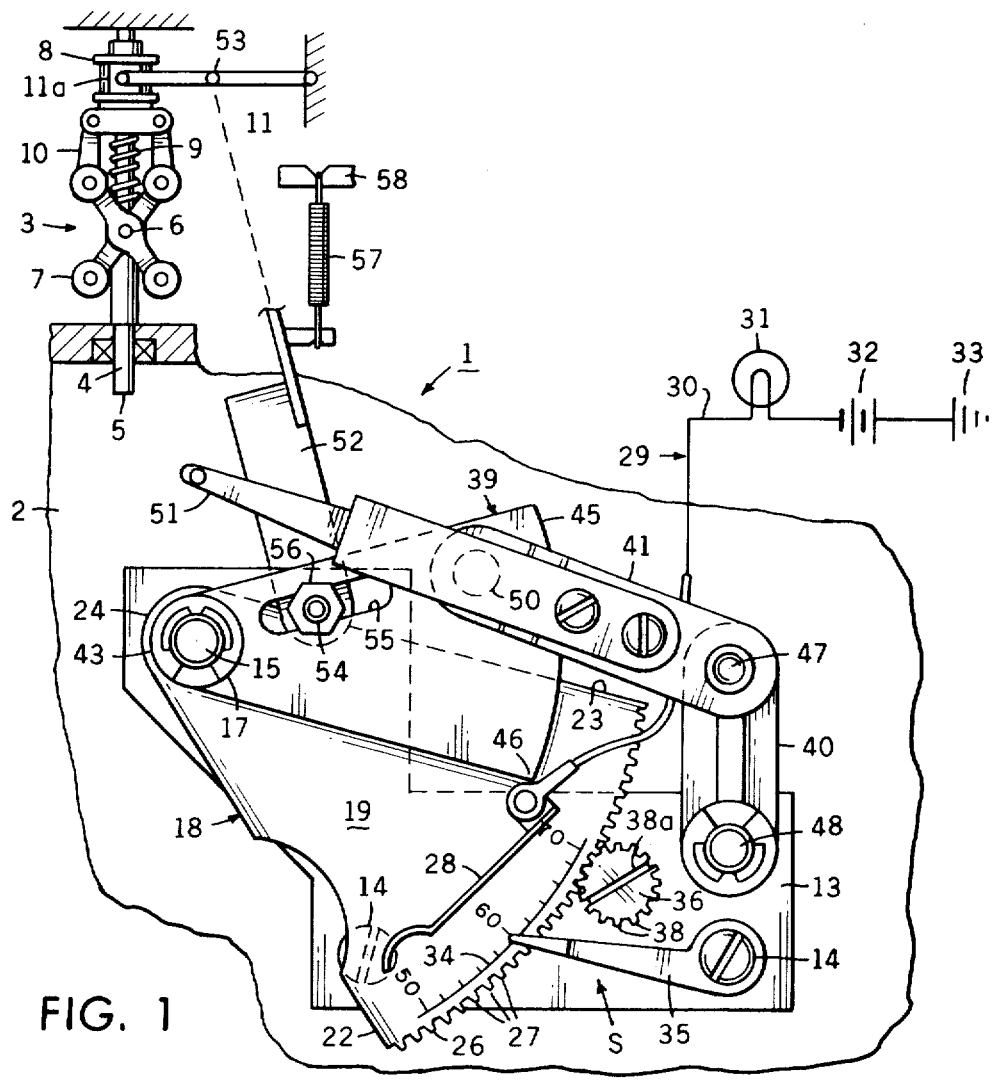
FIG. 1 is a plane view showing an information recorder, partially in schematic, embodying the present invention.
Figure 2:
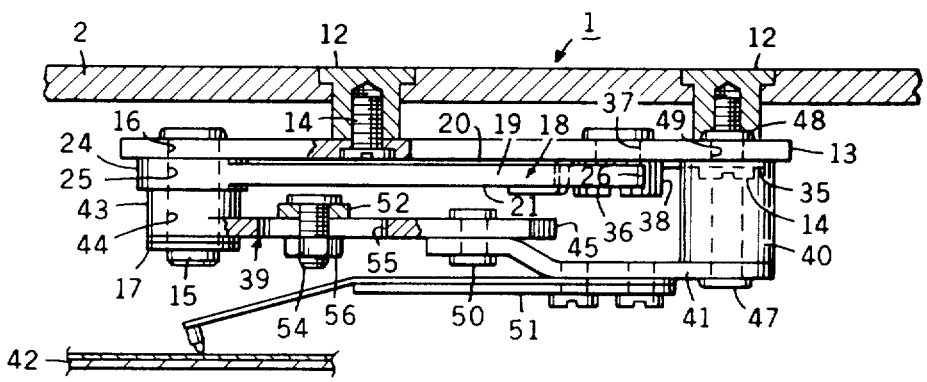
FIG. 2 is an elevational view taken from FIG. 1.

Referring now to the drawings in detail, an information recorder or instrument, indicated generally at 1, is provided with a metallic enclosing casing or housing 2, adapted for mounting on apparatus, such as vehicles, industrial machines or the like (not shown), and a rotatable drive mechanism 3 of a type well known in the art is journaled in the casing 2. The drive mechanism 3 is provided with a rotatable shaft 4 having an end 5 adapted to be rotated by a drive or power take-off from a drive portion of the apparatus, such as the vehicle transmission or industrial machine gear box (not shown). Rotation of the shaft 4 is transmitted through a pivot pin 6 to the fly-weight assemblies 7 which are pivotally movable or thrown outwardly in accordance with the rotational speed of said shaft, and a collar 8 is rotatably and axially movable on said shaft against the compressive force of a spring 9. Links 10 are pivotally connected between the collar 8 and the fly-weight assemblies 7 to translate the outward movement of said fly-weight assemblies due to rotation of the shaft 4 into axial movement of said collar on said shaft against the spring 9, and a pivot arm or crank 11 has one end pivotally connected with a non-rotatable block 11a mounted in slipping engagement on said collar while the other end is pivotally connected with the casing 2. The casing 2 is also provided with a plurality of metallic inserts 12 fixedly connected therewith, and a support plate or member 13 is seated on said inserts and fixedly connected therewith by suitable means, such as the screws 14.

An excess speed indicating mechanism indicated generally at S, is provided with a pivot pin 15 carried in a support plate aperture 16 and retained therein against displacement by a snap washer or retainer and groove assembly 17. An adjustable member or sector type gear 18 is provided with a sector or fan-shaped body 19 having opposed sides 20, 21, and the side 20 is movable on the support plate 13. The sector body 19 is also provided with opposed divergent edges 22, 23, and a hub portion 24 having a bore 25 therethrough pivotally or rotatably received in the pivot pin 15 is integrally formed with said sector body at one end thereof connecting with said divergent edges. A peripheral or arcuate surface 26 having gear teeth 27 therein is defined on the other end of the body portion 19 opposite to the hub 24 and connecting between the edges 22, 23, respectively. An electrical contact, such as the leaf-type spring 28, is mounted by suitable means on the side 21 of the sector body 19 forming a part of an electrical circuit, indicated generally at 29, of a type well known in the art for alerting the operator of excessive speed or rotation of the drive shaft 4, as discussed hereinafter. In the circuit 29, a lead 30 is connected between the contact 28 and one side of an operator warning device, such as a lamp 31, and the other side of said lamp is connected with a battery 32 which is grounded at 33. A speed or alternative revolutions per minute scale 34 is provided on the side 21 of the sector body 19 adjacent to the peripheral edge 26 there of for selecting the predetermined speed at which it is desired to energize the circuit 29 and warning device 31 thereof, and an indicating arm or pointer 35 is secured between one of the screws 14 and the support plate in indicating relation with the scale.

An adjusting or setting member, such as the pinion gear 36, is rotatably received for manual actuation in another aperture 37 provided in the support plate 13 and retained therein against displacement. The pinion gear 36 is provided with a plurality of gear teeth 38 in the peripheral portion or surface thereof, and said gear teeth 38 are meshed in adjustable driving engagement with the sector gear teeth 27. A slot 38a for receiving an adjusting tool is also provided in the pinion gear 36.

Driven or motion translating members, such as the sector shaped linkage 39 and the articulated linkages 40, 41 are provided to translate the input movement or rotation of the drive mechanism 3 into information records or markings on a time or clock driven record sheet or chart 42; however, since the chart and time driving or clock mechanism therefor is well known to the art, a detailed illustration and description thereof is omitted for the sake of simplicity. The sector shaped linkage 39 is provided with a hub portion 43 having a bore 44 therethrough which is pivotally or rotatably received on the pivot 15 in positioning engagement between the sector gear hub portion 24 and the retainer 17, and said sector linkage is spaced from the side 21 of the sector gear 18 in over-lapping relation therewith. The link 39 is provided with an arcuate or peripheral surface 45 opposite the hub 43 thereof, and a portion 46 of said link and the peripheral surface thereof defines a contact for movement into engagement with the contact 28 to complete the circuit 29 and energize the warning device 31, as discussed hereinafter. It should be noted that the sector link 39 is grounded through the pivot pin 15, the support plate 13, inserts 12 and casing 2 to the apparatus on which said casing is mounted, and in this manner, said sector linkage is also utilized as a component of the electrical circuit 29; however, it is contemplated that said sector linkage and contact 46 may be grounded in any other manner well known in the art. Articulated linkages 40, 41 are interconnected by an articulating pivot pin at 47, and the articulated link 40 has its other end pivotally connected with another pivot pin 48 which is received in another housing aperture 49 and retained therein against displacement. The other end of the articulated link 41 is pivotally interconnected with the sector linkage 39 by a pivot pin 50, and a marking member or stylus 51 is fixedly connected with the articulated link 41 by suitable means and urged toward marking engagement with the movable chart 42.

A connecting or driving link 52 has one end thereof pivotally connected with the pivot arm 11 at 53 and the other end thereof pivotally connected with another pivot pin 54 which is pivotally received in an adjusting slot 55 provided in the sector link 39 and connected therewith by suitable means, such as the nut 56. To complete the description of the recorder 1, a return spring 57 is connected between the connecting link 52 and a suitable stationary portion 58 in the casing 2, said return spring normally urging said connecting link, the sector link 39, and the articulated links 40, 41 in their original inoperative or at rest positions, as shown.

In the operation, the speed or revolutions per minute of the vehicle engine or industrial machine or the like is transmitted by a power take-off (not shown) to the drive shaft 4 of the drive mechanism 3 to effect different speeds of rotation of said drive shaft, and the drive pin 6 connected between said drive shaft and the fly-weight assemblies 7 effects concerted rotation thereof with said drive shaft. In this manner, the rotation of the fly-weight assemblies 7 effects a centrifugal force causing said fly-weight assemblies to pivot outwardly about the drive pin 6, and this movement is transmitted through the pivotal links 10 to effect coincidental downward or axial movement of the collar and block 8, 11a against the spring 9. The movement of the block 11a pivots the crank 11 in a counter-clockwise direction about its pivot to drive or move the connecting link 52 against the force of the return spring 57. The movement of the connecting link 52 is transmitted to the sector link 39 through the pivot pin 54 effecting concerted rotation of said sector link in a clockwise direction about its pivot pin 15. This pivotal movement of the sector link 39 is transmitted through the pivot pin 50 to the articulated links 40, 41 effecting concerted rotation of the link 40 in a clockwise direction about its pivot pin 48 and concerted rotation of the link 41 in a counter-clockwise direction about the pivot pin 47. In this manner, the aforementioned interrelated pivotal movements of the sector link 39 and articulated links 40, 41 in response to the input force transmitted thereto from the drive mechanism 3 through the connecting link 52 drives the marker 51 in a substantially vertical direction, and since the marker 51 is in marking engagement with the moving chart 42, the vertical movement of said marker is scribed or marked on said chart.

Of course, it is desirable to warn the operator of speed in excess of a predetermined value; therefore the speed indicating mechanism S is utilized to predetermine the speed at which such warning is effected. If it is desired to effect such operator warning at a speed of 60 miles per hour for instance, a tool, such as a screw driver (not shown), is engaged with the slotted portion 38a of the pinion gear 36 and turned or rotated in the appropriate direction to manually rotate or drive said pinion gear, and due to the meshing or driving engagement of the pinion gear teeth 38 with the teeth 27 of the sector gear 19, said sector gear is concertedly adjustably driven or rotated about its pivot pin 15 toward an adjusted or preselected position wherein the desired speed on the scale 34 of said sector gear is aligned with the pointer 35. This adjusting movement or rotation of the sector gear 19 about its pivot 15 effects the concerted movement of the contact 28 therewith to adjustably vary the distance between the contact 28 and the cooperating contact 46 on the sector link 39 in the inoperative or at rest position thereof. In this manner, by adjustably varying the distance or travel through which the sector link contact 46 must move to engage or make electrical contact with the sector gear contact 28, the speed at which the operator is warned is predetermined or preselected.

With the speed indicating mechanism S so adjusted to the preselected speed for operator warning the pivotal movement of the sector link 39 about its pivot pin 15 in response to the input force transmitted thereto from the drive mechanism 3, as previously described, moves the sector link contact 46 through its predetermined travel toward the sector gear contact 28, and when the predetermined speed of rotation of the drive shaft 4 is attained, the contact 46 is moved into engagement with the contact 28 to complete the electrical circuit 29 and energize the warning lamp 31. When the contacts 28, 46 are engaged, current flows from the battery 32 through the lead 30, the lamp 31, the contacts 28, 46 and the sector link 39 which is grounded through the casing 2, as previously mentioned. Of course, if the speed of the drive shaft rotation is increased to a value in excess of the predetermined speed, the sector link 39 is further pivoted about its pivot 15 and the arcuate surface 45 thereof which forms a portion of the contact 46 remains in engagement with the sector gear contact 28.

When the speed or rotation of the drive shaft 4 is reduced, the centrifugal force acting on the fly-weight assemblies 7 is correspondingly reduced, and the spring 9 urges the collar 8 upwardly toward its original position which, of course, rotates the crank 11 in a clockwise direction about its pivot toward its original position assisted by the force of the return spring 57 acting on the connecting link 52. In this manner, the crank 11 moves the connecting link 52 upwardly which effects the return pivotal movement of the sector link 39 in a counter-clockwise direction about its pivot pin 15 toward its original position, and such return pivotal movement of said sector link disengages its contact 46 from the sector gear contact 28 to again interrupt the electrical circuit 29 and de-energize the warning lamp 31. Such return movement of the sector link 39 and component parts associated therewith toward their original positions effects the concerted counter-clockwise and clockwise movements of the articulated links 40, 41 about the pivot pins 48, 47 toward their original positions, respectively, and of course, the marker 51 marks all such interrelated movements of the sector and articulated links 39, 40, 41 which are correlated with the speed of rotation of the drive shaft 4 on the chart 42.

From the foregoing, it is now apparent that a novel information recorder 1 meeting the objects set out hereinbefore, as well as other objects and advantageous features, is provided and that changes or modifications as to the precise configurations, shapes and details of the construction set forth in the disclosure by way of illustration may be made by those skilled in the art without departing from the spirit of the invention.

What is claimed is:

1. An information recorder comprising a casing having a rotatable drive mechanism therein, an electrical circuit in said casing including a warning device for energization upon a predetermined speed of drive mechanism rotation, chart means movable in said casing for continuously receiving markings thereon, a pair of pivot pins in said casing, means driven by said drive mechanism in response to the different rotatable speeds thereof including a sector linkage pivotally supported on one of said pivot pins, a contact portion on said sector linkage for connection in said electrical circuit, articulated linkage means pivotally connected with the other of said pivot pins and said sector linkage, means on said articulated linkage means in marking engagement with said chart means for marking such different rotatable speeds thereon, and other means pivotally connected with said drive mechanism and sector linkage, adjustable means adjustably movable on said one pivot pin relative to said driven means including contact means connected in said electrical circuit for engagement with said contact portion upon the pivotal movement thereof in response to rotatable speeds of said drive mechanism in excess of a predetermined value to effect energization of said warning device, and manually actuated adjusting means connected in adjusting engagement with said adjustable means for effecting the adjustable movement thereof to predeterminately space said contact means from said contact portion and thereby define the predetermined speed of drive mechanism rotation at which the warning device is energized.

2. An information recorder according to claim 1, wherein said adjusting means includes a member rotatably mounted in said casing in adjusting engagement with said adjustable means, said member being rotatable to effect concerted movement of said adjustable means for adjustably spacing said contact means from said contact portion.

3. An information recorder according to claim 2, comprising gear teeth on said adjustable means, said member including a pinion gear having teeth thereon drivingly engaged with those of said adjustable means, said pinion gear being manually rotatable to concertedly drive said adjustable means relative to said sector linkage toward a preselected position for adjustably spacing said contact means from said contact portion.

4. An information recorder according to claim 2, wherein said adjustable means includes a sector gear having gear teeth on a peripheral edge thereof, and said member includes a manually driven pinion gear having gear teeth thereon drivingly engaged with those of said sector gear, said pinion gear being rotatable in response to the manually applied force thereon to adjustably pivot said sector gear relative to said sector linkage and predeterminately space said contact means from said contact portion.

5. An information recorder according to claim 4, wherein said contact portion is connected through said sector linkage and casing to ground.

6. An information recorder comprising an enclosing casing having a rotatable drive mechanism therein, an electrical circuit in said casing including a warning device for energization in response to a predetermined speed of rotation of said drive mechanism, chart means movable in said casing for continuously receiving markings thereon, a pair of pivot pins in said casing, linkage means pivotally mounted on one of said pivot pins for movement in response to the speed of rotation of said drive mechanism, articulated linkage means having an articulated interconnection and opposed ends, one of said opposed ends being pivotally mounted on the other of said pivot pins and the other of said opposed ends being pivotally connected with said first named linkage means for concerted movement therewith including marking means in marking engagement with said chart means and movable relative thereto, other linkage means movable in said casing and having opposed portions, one of said opposed portions being pivotally connected with said drive mechanism, means defining an adjustable pivotal connection between the other of said opposed portions and said first named linkage means to effect pivotal movement thereof upon the movement of said other linkage means in response to the different speeds of rotation of said drive mechanism, said articulated linkage means being concertedly movable with said first named linkage means to move said marking means relative to said chart means and effect the marking thereon of the different speeds of rotation of said drive mechanism, contact means on said first named linkage means and connected through said first named linkage means and casing to ground, adjustable means adjustably movable on said one pivot pin including other contact means connected in said electrical circuit for engagement with said first named contact means to effect energization of said warning device, and means for moving said adjustable means toward a preselected adjusted position adjustably spacing said other contact means from said first named contact means to define the speed of rotation of said drive mechanism at which the warning device is energized.

7. An information recorder comprising an enclosing casing having a rotatable drive mechanism therein, support means in said casing and fixedly secured thereto, a normally open electrical circuit in said casing including a warning device for energization in response to a predetermined speed of rotation of said drive mechanism and adapted for connection with a power source, chart means movable in said casing for continuously receiving markings thereon, a first pivot pin connected with said support means, a first link having opposed portions, one of said opposed portions being pivotally movable on said first pivot pin, a second pivot pin connected with said support means, a second link having opposed ends, one of said opposed ends being pivotally movable on said second pivot pin, a third link pivotally connected with the other of said opposed portions of said first link and the other of said opposed ends of said second link including a marking member in marking engagement with said chart means for movement relative thereto, means pivotally connected with said drive mechanism and including means defining an adjustable pivotal connection with said first link and movable in response to the different speeds of rotation of said drive mechanism to effect the pivotal movement of said first link about said first pivot pin, said second and third links being concertedly movable with said first link to move said marking member relative to said chart means and mark thereon a record of the different speeds of rotation of said drive mechanism, a first contact on said first link movable therewith and connected to ground, first gear means in said casing between said support means and said first link and movable relative to said first link including a hub portion pivotally movable on said first pivot pin, an arcuate portion opposite to said hub portion, a plurality of first teeth on said arcuate portion, and a second contact connected in said electrical circuit for circuit closing engagement with said first contact to effect energization of said warning device, and manually actuated second gear means rotatably connected with said support means including a plurality of second teeth meshed in adjusting driving engagement with said first teeth, said second gear means being rotatable in response to a manually applied rotative force thereon to effect further driving engagement of said second teeth with said first teeth and move said first gear means relative to said first link toward a preselected adjusted position adjustably spacing said second contact from said first contact to predetermine the relative travel therebetween defining the predetermined speed of rotation of said drive mechanism at which said warning device is energized.

8. An information recorder comprising an enclosing casing, a rotatable drive mechanism mounted in said casing, chart means movable in said casing in one direction for continuously receiving markings thereon, marking means in marking engagement with said chart means and adapted for movement relative thereto in another direction substantially vertical to the one direction in which said chart is movable, said drive mechanism including means for translating the rotary movement thereof into vertical movement, and other means connected with said motion translating means and movable vertically on said drive mechanisms in response to the different speeds of rotation thereof, crank means pivotally connected with said casing and with said other means, said crank means being pivotally movable about its pivotal connection with said casing in response to the vertical movement of said other means, support means in said casing and fixedly connected therewith, a pivot pin connected with said support means, a sector link having a hub portion on the smaller end thereof pivotally received on said pivot pin and a free arcuate edge opposite said hub portion defining the larger end of said sector link, articulated linkage means pivotally interconnected and respectively having opposed end portions, one of said end portions being pivotally connected with said support means and the other of said end portions being pivotally connected with said sector link adjacent to its arcuate free edge, said marking means being connected with said articulated linkage means adjacent to said other end portion thereof, connecting means pivotally connected with said crank means and including means defining with said sector link an adjustable pivotal connection to said hub portion, said connecting means being driven by said crank means upon the pivotal movement thereof in response to actuation of said drive mechanism to concertedly pivot said sector link and said articulated linkage means and move said marking means in the other direction to mark on said chart the different speeds of rotation of said drive mechanism, an adjustable member including another hub portion pivotally received on said pivot pin, and another free arcuate end edge having a plurality of gear teeth therein opposite to said other hub portion, said sector link and adjustable member being spaced from said support means on said pivot pin and disposed in at least partial overlaying relation with each other, respectively, a normally open electrical warning circuit in said casing including a warning lamp for energization in response to a predetermined speed of rotation of said drive mechanism and adapted for connection with a power source, an electrical contact on said adjustable member concertedly movable therewith and connected in said electrical circuit, at least a portion of said first named arcuate edge defining another electrical contact for electrical warning circuit closing engagement with said first named contact upon the pivotal movement of said sector link through a predetermined travel, and an adjusting gear rotatably mounted on said support means including a plurality of other gear teeth meshed in adjusting driving engagement with the first named gear teeth on said adjustable member, said adjusting gear being rotatable in response to a manually applied rotative force applied thereto to effect the adjusting driving engagement of said other gear teeth with said first named gear teeth and adjustably pivot said adjustable means on said pivot pin relative to said sector link toward a preselected adjusted position adjustably spacing said first named contact from said other contact to predetermine the relative travel therebetween which defines the predetermined speed of rotation of said drive mechanism at which said warning circuit is closed to energize said warning lamp.

* * * * *

UNITED STATES PATENT OFFICE
CERTIFICATE OF CORRECTION

Patent No. 3,673,608          Dated      June 27, 1972

Inventor(s)  Henry Voorman, Jr.

It is certified that error appears in the above-identified patent and that said Letters Patent are hereby corrected as shown below:

Column 6, line 56, after "nection" insert -- adjacent --.

Signed and sealed this 24th day of April 1973.

(SEAL)
Attest:

EDWARD M. FLETCHER, JR.          ROBERT GOTTSCHALK
Attesting Officer                Commissioner of Patents